June 10, 1969  R. G. HUNT  3,449,003
SNAP COUPLING
Filed Nov. 8, 1965
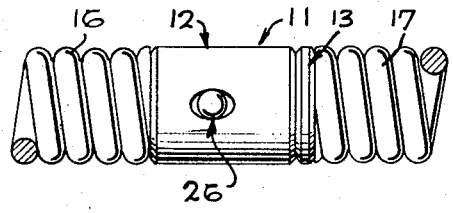
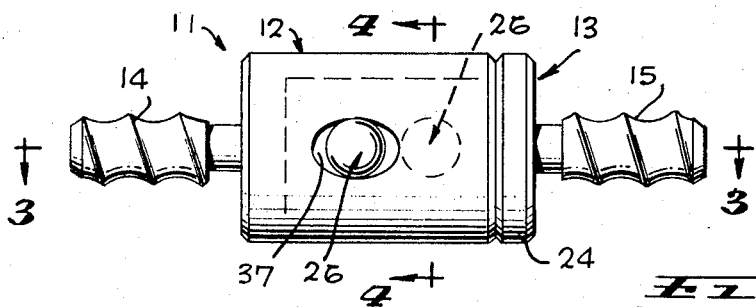
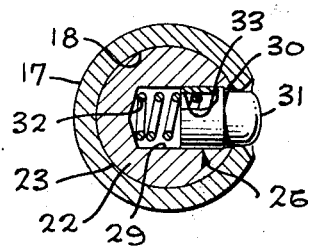
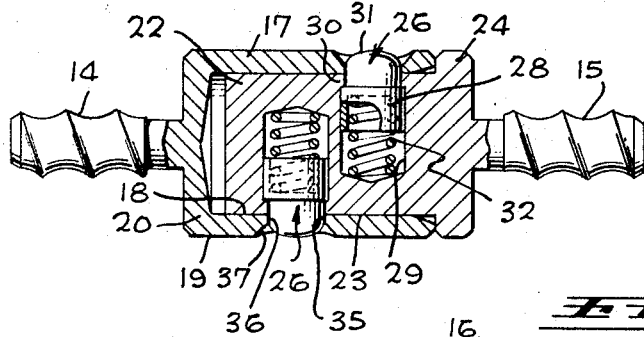
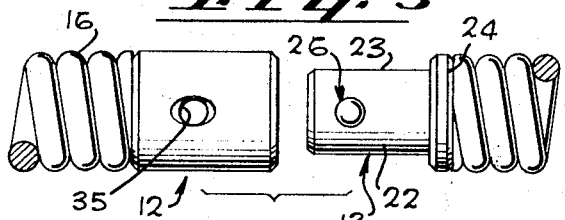
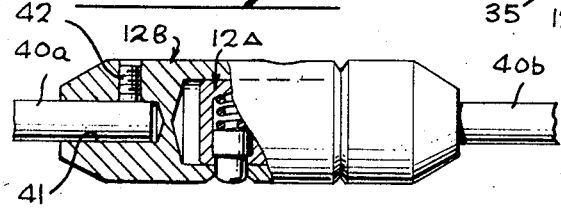
INVENTOR.
ROBERT G. HUNT
BY
ATTORNEYS

United States Patent Office 3,449,003
Patented June 10, 1969

3,449,003
SNAP COUPLING
Robert G. Hunt, Los Angeles, Calif., assignor to Marco Products Company, Los Angeles, Calif., a partnership
Filed Nov. 8, 1965, Ser. No. 506,791
Int. Cl. F16b 7/00; F16d 1/00; F16c 21/00
U.S. Cl. 287—119          1 Claim

ABSTRACT OF THE DISCLOSURE

The application discloses a coupling for flexible rods and the like comprising interfitting inner and outer members and latching elements carried by the inner member and received in openings in the outer member.

---

This invention has to do generally with tools used by plumbers for clearing obstructions from waste pipes, such as plumbers' snakes and sewer rods, and more particularly relates to means for joining sections of elongated elements, such as sections of flexible plumbers' snakes and sewer rods.

Plumbers commonly use elongated coiled spring elements known as plumbers' snakes for clearing pipes of stoppages. A cutting or entangling tool is attached to the front end of a section of snake and the snake inserted and advanced through the pipeline by rotating it as it is advanced. Depending upon the distance of the obstruction in the pipe from the place where the snake is inserted, it often is necessary to attach additional lengths of snake to the first section in order to have sufficient over-all length to reach and clear the obstruction. Similarly in some cases sectional sewer rods of much shorter length than the snakes are used and these must be coupled together as they are successively inserted in the pipe.

Heretofore considerable difficulty has been experienced in attaching and detaching the sections of plumbers' snakes and sewer rods because of the nature of the joints, many of which are cumbersome, require a tool for the operation, and are time consuming to operate. Also, many couplings are unsatisfactory in that they tend to loosen and become disconnected.

An object of the invention is to provide a new and improved coupling or joint for connecting two members which may be used for a variety of purposes but which is particularly designed and suited for connecting together sections of plumbers' snakes and sewer rod sections as well as connecting tools to these elements.

Another object is to provide such a coupling which is easily operable by the fingers without any tools to quickly connect or disconnect two elements.

A further object is to provide such a coupling that is self-locking to the extent that when the elements thereof are inserted one within the other the device will lock upon relative rotation of the parts.

Another object is to provide a coupling having a special locking button means designed to take maximum stress under operation and at the same time is so constructed that it is protected from being operated inadvertently by extraneous objects within a pipeline or the like.

A further object is to provide a particular locking button designed so that the main body of the button is engaged by the member in which the button is releasably received and takes the stress under operation, and so designed that it will not be tilted or angled to an appreciable degree under loading.

A still further object of the invention is to provide a coupling embodying a locking button means which is designed to have maximum travel without projecting beyond the parts and which is so designed that excess moisture does not detract from the proper operation thereof.

Another object is to provide a locking means embodying a spring-biased button providing for partial storage of the spring within the button and allowing maximum travel of the button.

Another object is to provide a construction embodying a novel locking button means having the safety features that the locking buttons do not project beyond the outermost element of the coupling and that it is necessary to fully depress more than one button in order to disassemble the coupling.

These and other objects will be apparent from the drawing and the following description. Referring to the drawing:

FIG. 1 is a fragmentary elevational view or side face view of a coupling embodying the invention shown connecting two wire coil plumbers' snake sections;

FIG. 2 is a view similar to FIG. 1, but on a larger scale and showing only the coupling parts;

FIG. 3 is a longitudinal sectional view on line 3—3 of FIG. 2;

FIG. 4 is a cross-sectional view on line 4—4 of FIG. 2;

FIG. 5 is a view similar to FIG. 1, but with the coupling disassembled; and

FIG. 6 is a sectional elevational view of the coupling modified for application to rods.

More particularly describing the invention, numeral 11 generally designates the coupling as a whole. This includes two main elements or sections, namely, an outer member 12 and an inner member 13. In the particular embodiment shown, each of the members 12 and 13 is shown provided with a spirally grooved or threaded stem, these being indicated by the numerals 14 and 15, respectively, for the reason that these particular coupling elements are designed to be mounted on the ends of coil spring plumbers' snake sections 16 and 17, respectively. Any suitable means may be used for securing the ends of the plumbers' snakes to the coupling elements. It is to be understood, of course, that the coupling elements 12 and 13 may be attached to members other than the plumbers' snake sections shown in FIGS. 1–5 and in such cases the ends of the coupling elements would be differently formed, as will be described later in connection with FIG. 6.

The outer member 12 of the coupling is generally cylindrical and hollow so that it has a cylindrical wall 17 having cylindrical inner and outer surfaces 18 and 19. In this particular form the outer member is closed at one end by an end wall 20.

The inner member 13 has a main body 22 which is cylindrical and substantially solid having a cylindrical peripheral surface 23. Beyond this surface the body of the member is radially enlarged to provide a flange 24. The inner member is designed to fit within the outer member with only sufficient clearance to make it easy to manually insert the same and it is thus movable both axially and rotatably within the outer member.

For the purpose of releasably connecting and locking the inner and outer members against relative movement I provide a pair of locking button assemblies designated generally by numeral 26. In each case these assemblies include a locking button having a cylindrical body 28 which is received for axial movement in a bore 29 extending transversely of the inner member and preferably radially inward from the periphery for a limited distance. In an area or region 30, the metal has been deformed around the outer end of the bore for the purpose of retaining the button which has a radially reduced rounded end portion 31. The button is urged outwardly by a coil compression spring 32 which is partially housed within a hollow portion or bore 33 provided in the body of the button thereby allowing for maximum movement of the button in relation to the depth of the bore.

The two buttons are spaced both circumferentially and axially of each other and preferably spaced circumferentially by 180°.

The outer member 12 is provided with button receiving holes 35 in position to register with the two buttons, respectively. Each hole includes an inner cylindrical section 36 and an outer, diverging wall section or dished wall 37, the purpose of the latter being to enable a person to fully depress the button by placing his finger in the opening. The parts are so dimensioned that, when the parts are assembled, the buttons do not project beyond the periphery of the outer member 12 and, consequently, there is no likelihood of the buttons being inadvertently depressed when in use in a pipeline or the like. Also, it is apparent that, to disconnect the parts, it is necessary to fully depress both buttons, and the buttons must both be in fully depressed position at the same time.

Although I have illustrated and described a preferred form of my invention, I contemplate that various changes and modifications can be made therein without departing from the invention. For example, in FIG. 6 I show a coupling designed for the purpose of joining or detachably connecting two steel rods or the like. The rods are designated by numerals 40a and 40b, respectively. In this form of the invention, the inner and outer members, designated 12A and 12B, respectively, are formed with rod-receiving bores 41 extending inwardly from their outer ends. Setscrews 42, or other desired means can be used to secure the coupling members on the ends of the rods. The interfitting portions of the coupling members are the same as in the coupling previously described.

I claim:

1. A coupling for a flexible rod or the like, comprising an outer member having a cylindrical bore open at one end of the member and closed at the other end, said other end of the member being formed to accommodate and permit of the attachment thereof to the end of a section of flexible rod, a solid inner member having a cylindrical portion receivable in the bore of said outer member, said inner member, when received in said outer member, extending therebeyond and providing an end portion formed to accommodate and permit of the attachment thereof to the end of a section of flexible rod, said inner member having a pair of axially and circumferentially spaced approximately diametrically transverse bores extending inwardly from its periphery for a limited distance, a lock-button in each of said bores and movable axially thereof, a compression spring behind each said button normally urging the same to project beyond the periphery of the inner member, said outer member having a pair of axially and circumferentially spaced openings extending from the interior to the exterior thereof adapted to receive said buttons when said inner member is inserted in said outer member and properly oriented therein whereby to secure said inner and outer members together, said buttons and said inner member having interengaging means limiting outward movement of said buttons whereby the outer ends of the buttons are within the peripheral limit of the outer member in the general area of said opening therein, said outer member being dished around said opening whereby to facilitate manually depressing the lock buttons with the fingers, said axially spaced bores lying on overlapping radii and being axially spaced a distance less than the diameter of the bores, said parts being so constructed and arranged as to allow the fingers of a hand to simultaneously depress both buttons.

References Cited

UNITED STATES PATENTS

| 2,539,229 | 1/1951 | Colburn | 287—86 |
| 389,335 | 9/1888 | Spear | 287—119 |
| 1,896,645 | 2/1933 | Pfauser | 287—119 |
| 2,273,102 | 2/1942 | Harris | 85—1 X |
| 2,538,919 | 1/1951 | Shaff | 287—119 |
| 3,070,129 | 12/1962 | Poulallion | 285—304 |

CARL W. TOMLIN, *Primary Examiner.*

WAYNE L. SHEDD, *Assistant Examiner.*

U.S. Cl. X.R.

52—726; 287—115